No. 674,512. Patented May 21, 1901.
A. J. McCORMACK.
WHEEL HUB.
(Application filed Mar. 29, 1900.)
(No Model.)
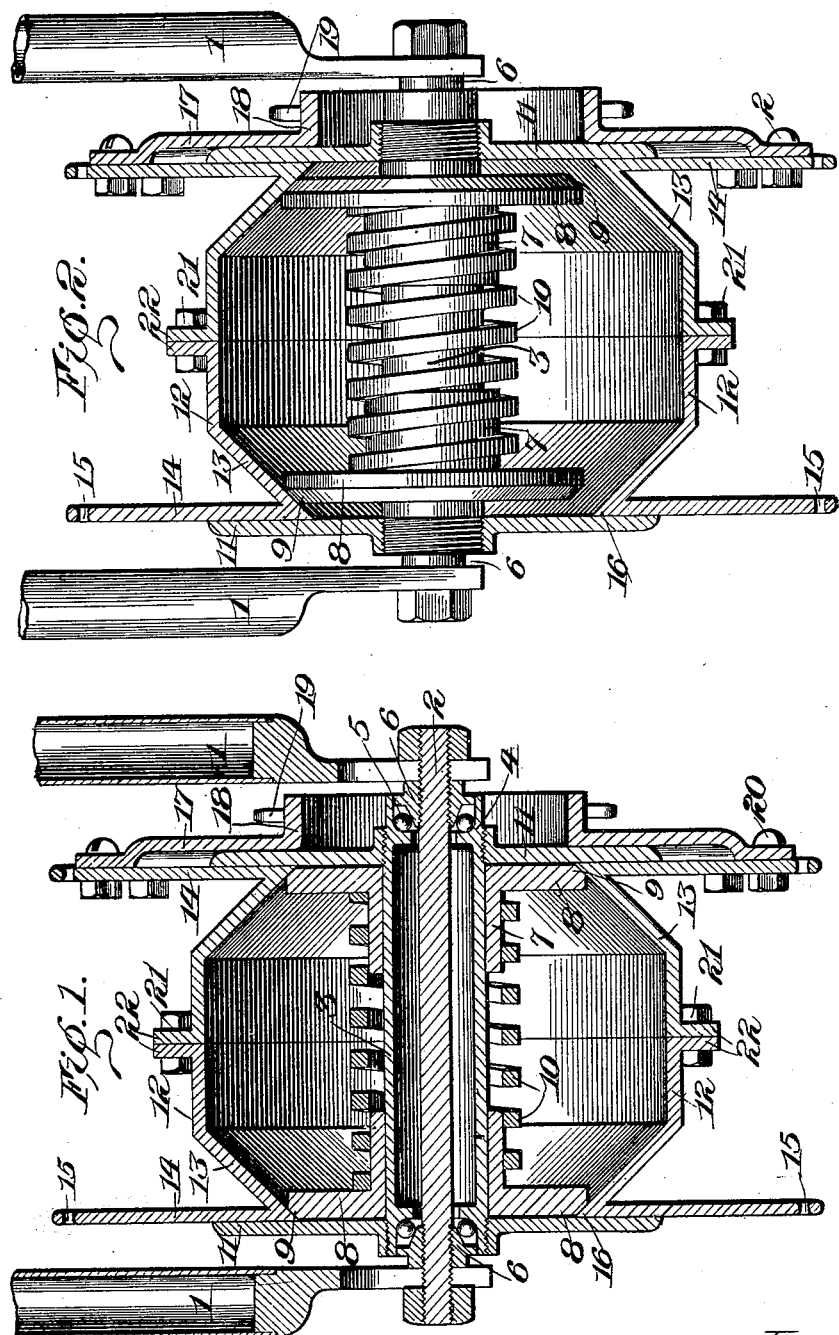
Witnesses:
Walter B. Payne.
G. Willard Rich.
Inventor
Andrew J. McCormack
by Church & Church
his Attorneys.

UNITED STATES PATENT OFFICE.

ANDREW J. McCORMACK, OF ROCHESTER, NEW YORK, ASSIGNOR OF ONE-HALF TO ELMER D. BRISTOL, OF SAME PLACE.

WHEEL-HUB.

SPECIFICATION forming part of Letters Patent No. 674,512, dated May 21, 1901.

Application filed March 29, 1900. Serial No. 10,668. (No model.)

*To all whom it may concern:*

Be it known that I, ANDREW J. MCCORMACK, of Rochester, in the county of Monroe and State of New York, have invented certain new and useful Improvements in Wheel-Hubs; and I do hereby declare the following to be a full, clear, and exact description of the same, reference being had to the accompanying drawings, forming a part of this specification, and to the reference-numerals marked thereon.

My present invention has for its object to provide a hub for vehicle-wheels embodying a suitable structure whereby the latter may be connected to the axle of the vehicle-frame and a limited relative movement of the parts permitted in order that any sudden jar or jolt upon the rim of the wheel, as in traveling over a rough or uneven road, will not be imparted to the vehicle.

To these and other ends my invention has for its object to provide certain improvements in the construction and combination of parts, all as will be described, and the novel features pointed out in the claims at the end of this specification.

In the drawings, Figure 1 is a cross-sectional view through a wheel constructed in accordance with my invention, and Fig. 2 is a similar view showing the operation of the device.

Similar reference-numerals in both figures indicate similar parts.

In illustrating my invention I have shown the hub as applied to the rear or driving wheel of a bicycle, the side forks or frame of which is indicated by 1 and the stationary bolt or axle connecting them by 2. Mounted upon the latter is a small or internal hub 3, supported upon its outer ends in ball-bearings of the usual construction, embodying the ball-cups 4, the balls 5, and the adjustable cone 6, threaded on the axle 2. The outer surface of the hub 3 is preferably cylindrical, and slidably mounted thereon are collars 7, having upon their outer edges circular flanges 8, the outer corners of which are beveled or chamfered, as shown at 9. A stiff coil-spring 10 surrounds the hub and collars 7 and abutting against the inner sides of the flanges serves to keep them extended, although permitting their relative movement longitudinally of the hub.

The wheel-hub is adapted to move vertically between the hub-flanges 11, and consists of the central or barrel portion 12, upon each end of which are the beveled sides 13, forming frustums of cones, around the outer edges of which are disks or broad flanges 14, having small apertures 15 near their outer edges adapted to receive the inner ends of the spokes of the wheel. The outer faces of the disks and the inner surfaces of the beveled or conical portions form a sharp edge 16 along their meeting-line, and the beveled edges 9 of the flanges 8 are adapted to abut closely against the latter when in normal position, as shown in Fig. 1, with the outer faces of the flanges resting against the relatively stationary disks 11 on the inner hub. The inclosed flanges 8, having the beveled edges corresponding to and fitting closely against the inner surfaces of the beveled portions at the sides of the wheel-hub, serve to center the inner hub upon the latter, permitting the parts to rotate together about the axle 2 as a common center, and the lateral movement of the flanges 8, which is permitted by the spring 10, allows the independent vertical movement of the inner and outer hubs when the wheel is jolted or jarred, as in passing over a rough or uneven surface.

In the drawings I have shown the hub as applied to the rear or driving wheel of a bicycle, and upon one of the disks 14 is a plate 17, extending over the flange 11 and provided with a collar 18, having the sprocket-teeth 19 and suitable screws or bolts 20, securing the parts.

For convenience in assembling the parts the wheel-hub is constructed in two portions, which are united and secured by bolts 21, passing through flanges or ears 22, formed upon the abutting edges. During its operation the wheel rotates about its axle, and the spring 10 is of sufficient strength to keep the movable flanges extended and to maintain the inner hub centrally within the outer one when the load is applied to the frame; but when the rim of the wheel encounters an obstacle or depression, causing a serious jolt, the inclined sides of the outer hub coöperating with the beveled edges of the flanges 8 will cause the disks to be moved laterally upon the inner hub, compressing the spring and preventing the vibration from being transferred to the frame. The spring expanding will return the parts to their normal position.

Wheel-hubs constructed in this manner are simple and consisting of few parts may be easily and cheaply manufactured, and by employing a circular outer hub supported centrally upon circular flanges having the beveled edges a lateral movement is permitted the hub in all directions, and the outer hub is guided to move in right lines perpendicular to the plane of the axle by the stationary flanges in the inner hub engaging the ends of the outer hub.

The construction shown, whereby the operating parts are located inside of the outer hub, is particularly desirable, as all the operating parts are protected from dust and wear, may be made cheaply, and readily assembled by an unskilled operator.

This device, it will be understood, can be applied to wheels of any kind of vehicle, but is particularly desirable for bicycles or automobiles and as a substitute for pneumatic tires.

I claim as my invention—

1. The combination with a hollow casing supported within the wheel having oppositely-extending angular surfaces upon its inner side and disks or annular rings at the outer edges of the latter, of the hub arranged within the casing adapted to be mounted upon an axis, the flanges on the hub engaging the disks on the casing, the flanges movably mounted upon the hub and engaging the angular faces to support the casing centrally upon the inclosed hub, and means for permitting the relative movement of the flanges to allow a relative movement between the hub and casing.

2. The combination with a hollow casing supported within the wheel having the conical surfaces at the edges of the casing extending in opposite directions, and the rings surrounding the edges of the latter, of an internal hub adapted to be mounted upon an axle and having the stationary flanges upon its ends engaging the rings, the flanges movably mounted on the hub having the beveled faces engaging the conical surfaces on the casing, and a spring extending between the latter flanges to separate them and center the casing on hub and allow a lateral movement between the said hub and casing.

3. The combination with the inner hub having the guide-flanges, the relatively movable disks and the spring, of the outer hub having rings coöperating with the guide-flanges the outer ring-plate extending over one guide-flange and the sprocket-wheel thereon, and relatively inclined surfaces between the movable disks on the inner hub and the outer hub.

4. The combination with a hub, having the bearings upon its ends, an axle extending through the hub and supported in the bearings, and the radially-extending flanges secured upon the ends of the hub, of the disks mounted upon the hub and movable relatively longitudinally thereof, the spring between the disks moving them toward the radial flanges on the hub and the outer hollow hub supported in the wheel having the surfaces bearing against the radial flanges on the inner hub and the angular faces engaging the edges of the disks.

5. The combination with an inner tubular hub provided with the bearings upon its ends, an axle extending through the hub and supported in the bearings, and the radially-extending flanges upon the ends of the hub, of the annular collars having the disks upon its their outer ends mounted upon the inner hub, and movable longitudinally thereof, the spring between the disks, and the hollow outer hub supported in the wheel having the bearing-surfaces engaging the radial flanges on the inner hub and provided with the angular faces arranged between said surfaces and engaged by the beveled portions of the disks.

ANDREW J. McCORMACK.

Witnesses:
WILLIAM E. DAVIS,
G. WILLARD RICH.